United States Patent [19]

Hegel et al.

[11] 4,017,099
[45] Apr. 12, 1977

[54] VEHICLE LEVELING SYSTEM

[75] Inventors: Robert W. Hegel; Burke A. West, both of Monroe, Mich.; Robert H. Verb, Ottawa, Ohio

[73] Assignee: Monroe Auto Equipment Company, Monroe, Mich.

[22] Filed: June 9, 1975

[21] Appl. No.: 585,322

[52] U.S. Cl. .......................... 280/707; 267/65 D; 188/322

[51] Int. Cl.² ........................................ B60G 11/28

[58] Field of Search .............. 280/124 F, 6 R, 6 H, 280/6.1, 6.11, 707; 267/64 R, 64 A, 65 R, 65 D; 188/1 A, 322; 73/11

[56] References Cited

UNITED STATES PATENTS

| | | | |
|---|---|---|---|
| 1,512,456 | 10/1924 | Carman | 246/169 A |
| 3,246,905 | 4/1966 | Morgan | 280/124 F |
| 3,269,685 | 8/1966 | Wallace | 280/6.1 |
| 3,339,910 | 9/1967 | Jackson | 267/65 R |
| 3,524,634 | 8/1970 | Schmidt | 280/6 |
| 3,584,894 | 6/1971 | Jackson | 280/124 F |
| 3,606,375 | 9/1971 | Jackson | 280/124 F |
| 3,633,935 | 1/1972 | Boyer | 267/65 D |

*Primary Examiner*—Philip Goodman
*Assistant Examiner*—John A. Carroll
*Attorney, Agent, or Firm*—Harness, Dickey & Pierce

[57] ABSTRACT

A vehicle leveling system comprising at least one leveling strut having a pressurizable chamber and a height sensing and controlling mechanism located directly on the strut, the height sensing and controlling mechanism being operable to control the internal pressure within the chamber without requiring any mechanical connection or engagement of the component parts thereof which are associated with the sprung and unsprung portions of the vehicle. In one embodiment of the invention, the height sensing and controlling mechanism includes a light source and a light responsive device for controlling operation of an electrically energized compressor, while in another embodiment of the present invention, the height sensing and controlling mechanism includes a proximity switch arrangement.

39 Claims, 5 Drawing Figures

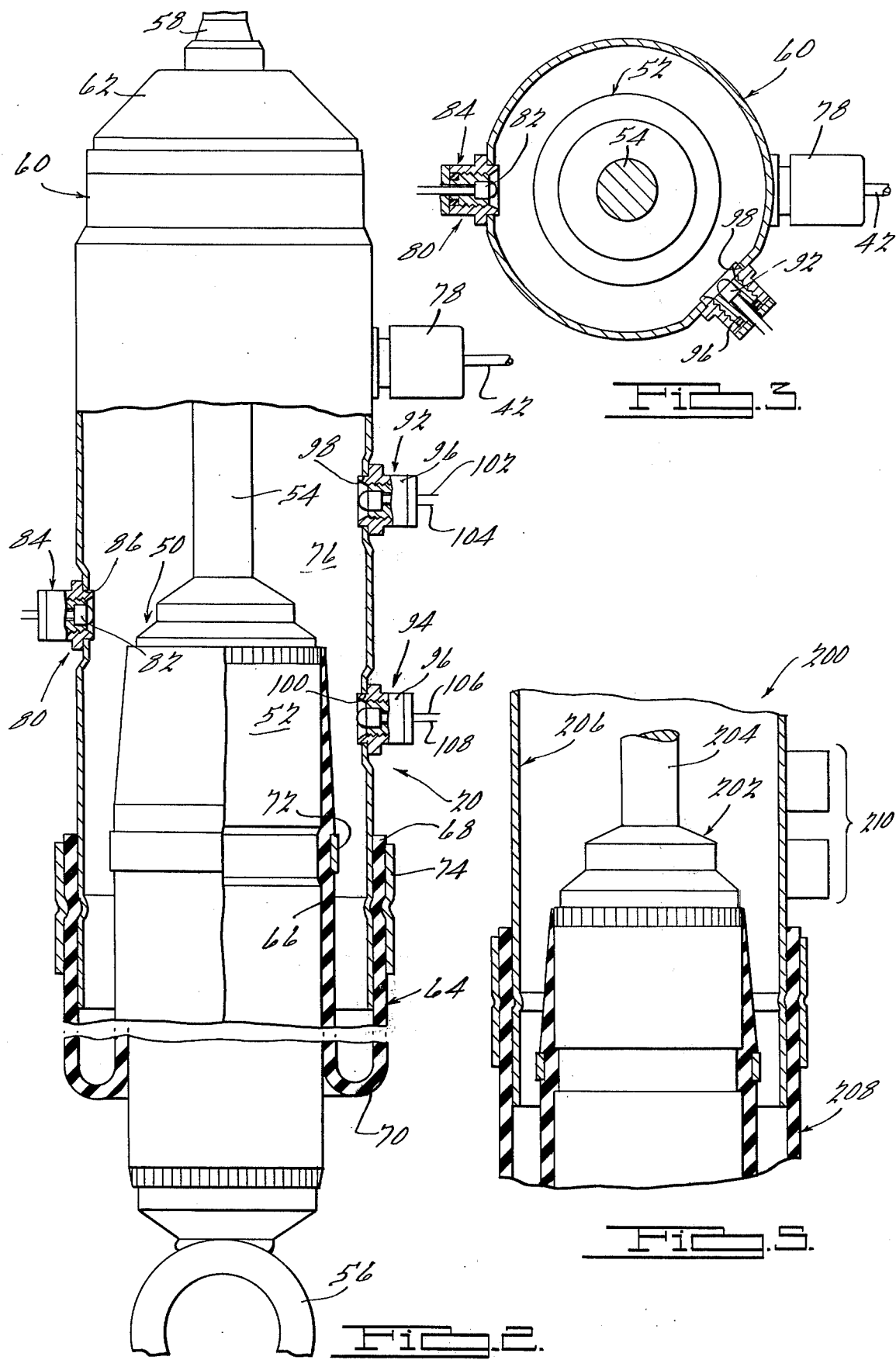

VEHICLE LEVELING SYSTEM

BACKGROUND AND SUMMARY OF THE INVENTION

It has heretofore been the practice in vehicle leveling systems that function to maintain a predetermined height relationship between the chassis (sprung portion) of a vehicle and its ground engaging axle assemblies (unsprung vehicle portion), to utilize one or more auxiliary fluid suspension component(s) to supplement the load carrying capacity of the primary vehicle springs. A pressure source has been included in such leveling systems for supplying pressurized fluid to the auixiliary suspension components when a load of predetermined magnitude has been added to the vehicle chassis, whereby the auxiliary suspension components become operable to supplement the load carrying capacity of the primary springs to return the vehicle chassis to a level or other desired height relationship with respect to the ground engaging axle. When the vehicle load is removed, the primary suspension springs and pressurized auxiliary suspension components coact to cause the chassis to rise above the desired height relationship, thereby requiring that the pressurized fluid be exhausted from the auxiliary suspension components.

To accomplish the aforesaid pressurizing and exhausting of fluid from the auxiliary suspension components, it has been the practice to utilize some type of a height detecting controller located remote from the components at a suitable position between the ground engaging axle and vehicle chassis to sense sustained changes in the height relationship therebetween and control fluid flow between intake and exhaust valve components. Such remotely located controllers have been found to be objectionable for a number of reasons, including the fact that they necessitate separate factory or field installation, as well as require the use of a myriad of fluid couplings and linkages for operatively connecting the controller between the sprung and unsprung masses of the vehicle. Additionally, such remotely located height controllers have been subject to objectionable criticism due to the fact that they must be accurately positioned and adjusted apart from other components of the system in order to assure the desired overall operation of the system.

It has heretofore been proposed to integrate or combine such height controlling devices with the auxiliary suspension components, such as is disclosed in U.S. Pat. Nos. 3,584,894 and 3,606,475, through the utilization of mechanical switching devices located directly upon the auxiliary suspension components, thereby eliminating the need for mechanical linkages between the height controller and the vehicle's sprung and unsprung positions. Unfortunately, however, such mechanical switching devices have been found to be subject to wear and relate attrition due to the hostile operative environment thereof as well as the large number of interrelated moving mechanical components embodied therein.

The present invention provides a new and improved vehicle leveling system which is intended to overcome the various objectionable characteristics of combination auxiliary suspension components and height controlling devices in the prior art through the provision of a novel height sensing and controlling mechanism which is entirely without or void of any moving mechanical components which might be subject to objectionable wear, misadjustment, failure, etc. More particularly, the height sensing and controlling mechanism embodied in the present invention is designed to utilize either an optical or proximity type switching mechanism so that there is no mechanical interconnection between the sensing elements which are associated with the sprung and unsprung portions of the vehicle.

It is, therefore, a primary object of the present invention to provide a new and improved leveling system wherein the height sensing and controlling mechanism is combined directly with the auxiliary suspension components.

It is a more particular object of the present invention to provide a new and improved combined height sensing and controlling mechanism for an auxiliary suspension component which is entirely without mechanical interconnection between those parts thereof associated with the sprung and unsprung portions of the vehicle.

Still a more particular object of the present invention is to provide a new and improved height sensing control mechanism of the above described type which utilizes an optical system including a light source and means sensitive to said light source for controlling pressurization of the associated auxiliary suspension components.

It is a related object of the present invention to utilize a portion of the auxiliary suspension component as a shutter element for controlling the transmission of light between the light source and the light sensitive means.

It is a further object of the present invention to provide a new and improved leveling system of the above described type wherein the height sensing and controlling mechanism includes proximity switch means for providing an electrical signal responsive to the relative orientation of certain parts of the auxiliary suspension components associated with the sprung and unsprung portions of the vehicle.

It is still a further object of the present invention to provide a new and improved leveling system of the above described type which finds particularly useful application with an electrically energized air compressor.

It is yet another object of the present invention to provide a new and improved leveling system, as set forth above, which is of a relatively simple design, is economical to manufacture and will have a long and effective operational life.

Other objects and advantages of the present invention will become apparent from the following detailed description taken in conjunction with the accompanying drawings.

BRIEF DESCRIPTION OF THE DRAWINGS

FIG. 2 is an enlarged side elevational view, partially broken away, of an auxiliary suspension component incorporating one embodiment of the present invention;

FIG. 3 is a transverse cross-sectional view of the suspension component shown in FIG. 2;

FIG. 5 is a fragmentary cross-sectional view of an alternate embodiment of an auxiliary suspension component incorporated in the leveling system of the present invention.

DETAILED DESCRIPTION OF THE PREFERRED EMBODIMENTS

Figure 1:
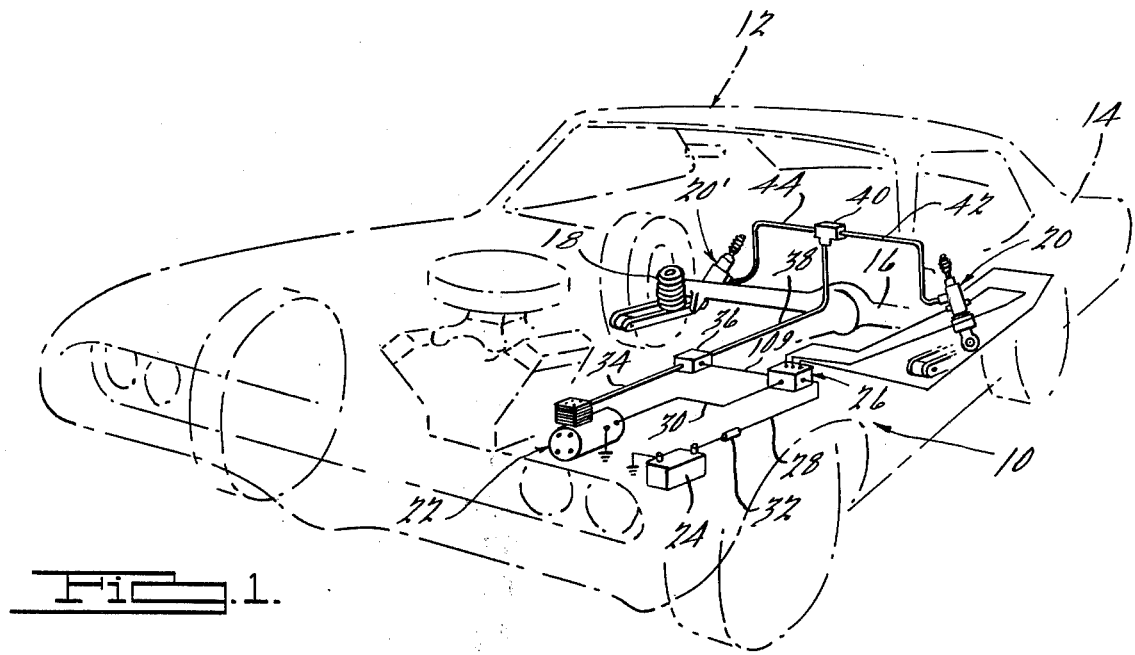
FIG. 1 is a schematic representation of one preferred embodiment of the leveling system of the present invention, as shown in operative association with a typical automotive vehicle depicted in phantom lines.

Referring now in detail to the drawings, and in particular to FIG. 1 thereof, a vehicle leveling system 10, in accordance with one preferred embodiment of the present invention, is shown in operative association with a typical automotive vehicle representatively designated by the numeral 12. The vehicle 12 comprises a sprung portion of chassis 14 and an unsprung or axle portion 16 between which main or primary suspension springs 18 are located. Generally speaking the leveling system 10 comprises a pair of auxiliary suspension components 20 and 20' which are adapted to be selectively pressurized from a source of fluid pressure, such as an electrically energized air compressor 22. The compressor 22 is supplied with electric energy from a conventional 12-volt vehicle battery 24 which is communicable with an electrical control module 26 via an electrical conductor 28. The module 26 is in turn connected to the compressor 22 via a suitable conductor 30, and a suitable safety fuse 32 may be provided in the electrical circuit connecting the battery 24 with the compressor 22. The compressor 22 is adapted to supply pressurized air via a conduit 34 to a control valve mechanism 36, which mechanism 36 is in turn connected via a conduict 38, T-fitting 40 and conduits 42 and 44 with the auxiliary suspension components 20 and 20'. Briefly, in operation of the leveling system 10, at such time as the vehicle 12 becomes heavily loaded, the control module 26 will effect energization of the compressor 22 and operation of the valve 26 such that pressurized air will be supplied to the components 20, 20' thereby raising a sprung portion 14 of the vehicle 12 to a level or other predetermined elevated attitude. At such time as the vehicle 12 is unloaded, the control module 26 will effect actuation of the control valve 36 such that the components 20, 20' will be vented to atmosphere, whereby the sprung portion 14 of the vehicle 12 will be lowered to some predetermined attitude.

Referring now in detail to the construction and operation of the auxiliary suspension component 20, as best seen in FIGS. 2 and 3, the component 20 comprises, by way of example, a direct acting hydraulic shock absorber 50 having a hydraulic cylinder or housing 52. Extending upwardly from the cylinder 52 is a reciprocable piston rod 54 which is connected at its lower end to a piston (not shown) that is reciprocable with the cylinder 52. The lower end of the cylinder 52 is provided with a lower end fitting 56 which is adapted to be secured in a conventional manner to the unsprung portion 16 of the vehicle 12, while the upper end of the piston rod 54 is provided with an upper end fitting 58 adapted to be secured in a conventional manner to the sprung portion of the vehicle 12. Mounted on and reciprocable with the piston rod 54 is an annular dirt or dust shield member 60 which extends coaxially of the piston rod 54 and is spaced radially outwardly from the outer periphery of the cylinder 52. The upper end of the dirt shield 60 is provided with a generally inverted cup-shaped end cap 62 that is secured to the piston rod 54 and encloses the upper end of the dirt shield 60. Disposed between the lower end of the dirt shield 60 and the cylinder 52 is a rolling diaphragm member, generally designated 64. The member 64 is fabricated of a suitable flexible material, such as fabric reinforced rubber, and comprises an inner portion 66 that is sleeved over the outer periphery of the cylinder 52. The diaphragm member 64 also comprises an outer portion 70 that is sleeved over the lower end of the dirt shield 60, with the inner and outer portions 66, 68 being connected by a reversely folded rolling portion 70, as illustrated in FIG. 2. The end portions 66, 68 are secured to the cylinder 52 and dirt shield 60 by suitable clamping rings or the like 72, 74, respectively, with the result that the dirt shield 60 and diaphragm 64 define a pressurizable chamber 76 which is adapted to be selectively pressurized by fluid, i.e., compressed air, supplied from the compressor 22 via the conduict 42. Suitable attachment fitting means 78 is provided on the dirt shield 60 for securing the adjacent end of the conduit 42 through, as will be apparent to those skilled in the art.

In accordance with the principles of the present invention, the auxiliary suspension component 20 shown in FIGS. 2 and 3 is provided with a new and improved height sensing and control mechanism which includes a light source, generally designated by the numeral 80. The light source 80 is preferably in the form of a light emitting diode (LED), or alternatively, a suitable filament light source well known in the art. Typically, the light source 80 may be of the 600 to 700 nm spectral region and a suitable embodiment thereof is manufactured by the Fairchild Semi-Conductor Company and is identified by the part No. FLV101. It will be appreciated, of course, that equivalent or similar-type light sources will operate satisfactorily in the applicant's invention. The LED 82 is adapted to be secured by a suitable attachment fitting, generally designated 84, directly upon the side wall of the dirt shield 60, whereby diode 82 directs light through a suitable opening 86 into the interior of the chamber 76. Suitable electrical conductors 88, 90 are intended to supply electrical energy to the diode 82 and are connected in the electric circuitry of the leveling system 10 in a manner hereinafter to be described. As best seen in FIG. 3, the attachment fitting 84 is arranged so as to support the diode 82 such that the light emitted thereby is coincident with a line extending diametrically through the axis of the piston rod 54.

The light source 80 is cooperable with a pair of light sensitive devices, generally designated by the numerals 92 and 94, which are also located or mounted upon the dirt shield 60 in a manner best seen FIGS. 2 and 3. The light sensitive devices 92, 94 are preferably, although not necessarily, in the form of a pair of photoresistors characterized as having an electrical resistance which is inversely proportional to the amount of light incident thereon. One satisfactory type photoresistor is manufactured by Clairex Corporation and identified by part No. CIL-704L. The devices or photoresistors 92, 94 are operatively supported upon the dirt shield 60 by means of a pair of suitable attachment fittings 96 which are vertically or axially aligned with one another and permit light from the diode 82 to be transmitted thereto through a pair of vertically or axially openings 98, 100, respectively, in the side wall of the dirt shield 60. The photoresistors 92, 94 are preferably circumferentially oriented upon the dirt shield 60 such that they are approximately 135° from the light emitting diode 82, although this arrangement may be varied in accordance with the type of light source and light sensitive devices being used. The photoresistors 92, 94 are adapted to be connected via suitable conductors 102, 104 and 106, 108, respectively, with the electrical control circuit hereinafter to be described. This control circuit is preferably, although not necessarily, embodied in the control module 26 which is in electrical communication with the control valve 36 via a suitable conductor representatively designated by the numeral 109 in FIG. 1. The control valve may be of any suitable construction and adapted, for example, to open and close a flow passage between the conduits 34 and 38 in one mode of operation when the compressor 22 is supplying pressurized fluid to the auxiliary suspension components 20; in a second mode of operation, the control valve 36 is intended to vent the conduit 38 to atmosphere, whereby to relieve the pressure within the components 20, 20' to effect lowering of the sprung portion 14 of the vehicle 12.

It is to be noted that the suspension component 20' is identical in construction and operation to the component 20, with the exception that no light source or light sensitive devices, such as the components identified above by the numerals 82, 92 and 94, are associated therewith. Accordingly, a detailed description of the suspension component 20' is omitted for purposes of conciseness of descripton.

Figure 4:
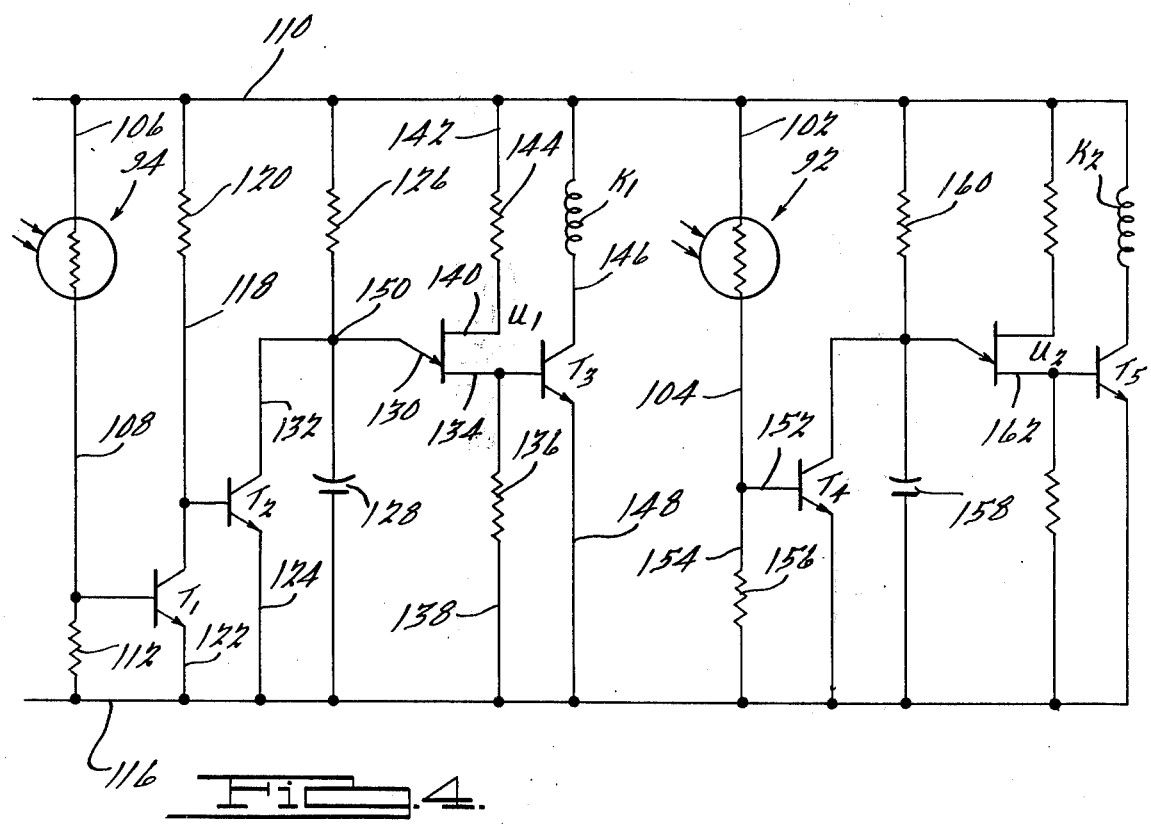
FIG. 4 is a schematic representation of one preferred embodiment of the electric control circuit embodied in the present inventon.

Referring now in detail to the electrical control curcuit shown in FIG. 4 and embodied in the control module 26, said conduit incorporates amplifying and timing circuits which are adapted to be supplied with electrical energy, for example, from any 9-volt regulated power supply source which provides a constant output regardless of variations of input voltage originating, for example, from the vehicle battery 24. The voltage supply is connected in any suitable manner to primary main and ground conductors 110 and 116, respectively. The first stage amplifier circuit comprises the photoresistor 94, which represents the lower photoresistor on the dirt shield 60, that is connected via conductor 106 to the main conductor 110 and via conductor 108 to the base of transistor $T_1$, and through bias resistor 112 to the main ground conductor 116. The output from $T_1$ is connected to the base of transistor $T_2$ and also to supply line 110 through conductor 118 and load resistor 120. The emitters of $T_1$ and $T_2$ are connected to the ground conductor 116 via conductors 122 and 124, respectively. The output from $T_2$ is connected to the first stage of a timing circuit which consists of resistor 125, capacitor 128, and unijunction transistor $U_1$. The resistor 126 is connected between the output from the amplifier stage and the supply conductor 110, while the capacitor 128 is connected between the output from the transistor $T_2$ and the ground conductor 116. The unijunction transistor $U_1$ has its emitter 130 also connected to the output from transistor $T_2$ via conductor 132, with its base-one terminal 134 connected to the base of transistor $T_3$ and tied through load resistor 136 and conductor 138 to the ground conductor 116, and its base-two terminal 140 connected to the main supply conductor 110 through conductor 142 and resistor 144. A third transistor $T_3$ has its output connected to supply conductor 110 via conductor 146 and normally de-energized coil $K_1$, which consists of the coil of the solenoid valve 36, or alternatively, the coil of a relay which drives the valve 36, as will be apreciated by those skilled in the art. The emitter of transistor $T_3$ is connected to the ground conductor 116 via conductor 148, as shown.

In operation of the control circuit, when no light is being received by the photoresistor 84, the resistance thereof remains high, preventing transistor $T_1$ from conducting. With transistor $T_1$ "off", the voltage at the base of transistor $T_2$ renders it conductive, which in turn prevents capacitor 128 from charging by effectively maintaining the potential at node 150 at ground potential. With the potential at the emitter of the unijunction transistor $U_1$ substantially at ground, $U_1$ is off and no base current is supplied to transistor $T_3$; therefore, transistor $T_3$ is non-conductive and coil $K_1$ remains de-energized so that the valve 36 is closed to atmosphere. When light from LED 82 is incident on the photoresistor 84, indicating the vehicle attitude is too high, the resistance of the photoresistor 94 drops substantially, thereby providing sufficient current to the base of transistor $T_1$ to render it conductive. With transistor $T_1$ "on", little current is present at the base of transistor $T_2$; thus transistor $T_2$ is non-conductive and hence capacitor 128 begins to charge, and after a certain time delay, determined by the values of the resistor 120 and the capacitor 128, the threshold value of the unijunction transistor $U_1$ is exceeded, thereby rendering $U_1$ conductive. This permits the capacitor 128 to discharge through the load resistor 136 connected to the base-one terminal 134, which renders transistor $T_3$ conductive. When transistor $T_3$ is on, the coil $K_1$ is energized which energizes or opens the solenoid valve 36 to communicate the conduit 38 and hence the components 20, 20' with atmosphere.

The second stage of the control circuit of the system 10 contains the photoresistor 92 and is similar to the herinabove described first stage, with the exception of the amplifier section. In particular, the photoresistor 92 is connected via conductor 102 to the main supply conductor 110, and through conductors 104 and 152 to the base of transistor $T_4$, and through conductor 154 and resitor 156 with the ground conductor 116. The output from transistor $T_4$ is connected to a timing circuit identical to that previously described. In this stage of the circuit, there is no need for an added switching transistor comparable to transistor $T_1$ in the first amplifier section. This is because, contrary to the situation existing with the lower photoresistor 94, the low resistance state of 92, corresponding to the presence of light at the photoresistor, represents a "do nothing" condition. Thus, with photoresistor 92 at a low magnitude of resistance, there is sufficient current present at the base of transistor $T_4$ to render it conductive. With transistor $T_4$ thus conductive, charge is prevented from accumulating on capacitor 158, and the unijunction transistor $U_2$ and switching transistor $T_5$ remain off. However, when the shock absorber 50 is blocking the light to the photoresistor 92, indicating that the sprung portion 14 of the vehicle 12 is too low, air must be added to the system. Under such a condition, the absence of light on photoresistor 92 raises its resistance substantially, thereby shutting off transistor $T_4$. With transistor $T_4$ off, capacitor 158 is permitted to charge until, after a certain time delay determined by the values of resistor 160 and capacitor 158, the threshold potential of the unijunction transistor $U_2$ is attained. This renders transistor $U_2$ conductive which permits the capacitor 158 to discharge through the base-one terminal 162 of unijunction trnsistor $U_2$ and turn on transistor $T_5$. With transistor $T_5$ conducting, coil $K_2$ is energized, which in turn effects opening of the solenoid valve 36 communicating conduits 34 and 38, and energization of the compressor 22. Accordingly, compressed air is supplied to the components 20, 20' to effect elevation of the sprung portion 14 of the vehicle 12 to a level or other predetermined attitude. As compressed air is supplied to the chamber 76, the dirt shield 60 will move upwardly relative to the shock absorber 50 to a position wherein light from the LED 82 is incident upon the upper photoresistor 92, whereupon the resistance of photoresister 92 is reduced a sufficient magnitude to permit current flow to the base of transistor $T_4$ to render it conductive and thus the unijunction $U_2$ and transistor $T_5$ remain off to effect de-energization and closing of the valve 36 and de-energization of the compressor 22.

It will thus be seen that when the upper end of the shock absorber 50 blocks the transmission of light from the LED 82 to the lower photoresistor 94 and permits light to be transmitted to the upper photoresistor 92, the solenoid valve 36 remains closed to atmosphere and the compressor 22 remains de-energized. At such time as the vehicle becomes loaded to a predetermined magnitude, resulting in the dirt shield 60 moving downwardly relative to the shock absorber 50, the upper end of the shock absorber 50 will block the transmission of light from the LED 82 to the upper photoresistor 92 as well as to the photoresistor 94. Under these conditions, the solenoid valve 36 will be opened and the compressor 22 will be energized, whereby pressurized air will be communicated to the suspension components 20, 20' to effect raising the sprung portion 14 of the vehicle 12. When the load on the vehicle 12 is removed, the primary suspension springs 18 of the vehicle 12 will cause the sprung portion 14 thereof to be raised, whereupon the upper end of the shock absorber 50 will be displaced axially relative to the dirt shield 60, thereby causing light from the LED 82 to be transmitted to the lower photoresistor 94, whereupon the solenoid valve 36 will exhaust the conduit 38 to atmosphere to permit lowering of the sprung portion 14 of the vehicle 12 to a position wherein the shock absorber 50 and dirt shield 60 assume the relative orientation shown in FIG. 2. It will be noted that the vertical spacing between the photoresistor 92 and 94 may be varied in accordance with the desired permissible axial movement between dirt shield 60 and shock absorber 50 before the valve 36 and compressor 22 become energized or de-energized. It will also be appreciated that the time delay function incorporated in the electric circuitry is intended too prevent premature energization of the compressor 22 and/or solenoid valve 36 during such time as the vehicle traverses relatively irregular road surfaces, such as when the vehicle passes over a railroad grade crossing, etc., and as previously mentioned, the duration of such time delay can be controlled by the magnitude of the capacitors 128, 158 and resistors 126, 160.

in one preferred construction of the control circuit, the below listed components are identified by and/or have the respective values shown, although it will be readily appreciated that these sources and values may be varied in accordance with specific applications.

| Component | Identification, Value and/or Source |
|---|---|
| Unijunction Transistors $U_1$, $U_2$ | 2N1671B |
| Transistors $T_1$, $T_3$, $T_5$ | 2N4401 Mot. |
| Transistors $T_2$, $T_4$ | D40D G.E. |
| Resistor 112 | 1,000 Ohms |
| Resistor 126 | 68,000 Ohms |

-continued

| Component | Identification, Value and/or Source |
|---|---|
| Resistor 144 | 100,000 Ohms |
| Resistor 136 | 47 Ohms |
| Capacitors 128, 158 | 100 Mfd. |
| Coils $K_1$, $K_2$ | 12v.-S.P.S.T. |

It is to be noted that instead of utilizing photoresistors as the means for controlling the leveling system in response to light received from and transmitted by the LED 82, it is contemplated that phototransistors could be used. As will be appreciated by those skilled in the art, phototransistors have a very low resistance when light is incident thereon in a manner very similar to the above-described photoresistors 92, 94, with the principal difference between phototransistors and photoresistors being that the phototransistors are relatively faster in operation and may need additional light to effect actuation thereof as compared to photoresistors. Accordingly, phototransistors will find highly satisfactory application in the above-described eletrical circuit, with the only possible change being that a higher capacity LED be incorporated therewith.

Referring now to FIG. 5, an alternate embodiment of the present invention is shown wherein an auxiliary leveling component 200 comprises a direct acting hydraulic shock absorber 202 having a piston rod 204, dirt shield 206 and rolling diaphragm 208, all of which are identical in construction and operation as the analogous components of the units 20, 20'. Associated with the suspension component 200 is a proximity switch mechanism, generally designated 210, which is intended to operate similar to the diode 82 and photoresistors 92, 94 in controlling operation of an associated solenoid valve and air compressor without requiring mechanical interconnection between the arts of the suspension component 200 associated with the sprung and unsprung portions of the associated vehicle. Any number of different types of proximity switches may be used satisfactorily, including inductive and capacitance type switches, which function to sense the presence and hence position of the upper end of the associated shock absorber 202 relative to the dirt shield 206, and thereby provide a suitable control signal for actuation of the associated compressor and solenoid valve.

It will be seen from the foregoing that the present invention provides a novel leveling system incorporating an auxiliary suspension component wherein no mechanical interconnection is required between the height sensing and controlling mechanism parts associated with the sprung and unsprung portions of the associated vehicle. Accordingly, the various problems associated with similar prior art devices are effectively overcome by eliminating sources of wear, misadjustment and related attrition. In one embodiment of the present invention, the height sensing and controlling means is achieved optically, which term, as used herein, is intended to encompass any type of control system tht functions entirely or in part with a light source and means responsive to the light source as a controlling factor in the leveling system. In another embodiment of the present invention, the relative positions of the portions of the suspension components are sensed by an electronic proximity switch device which operates in a similar non-mechanical fashion in ascertaining when the associated leveling valve and source of pressurized media are to be connected to and be communicable with the auxiliary suspension components. One particularly important feature of the present invention resides in the fact that the shock absorber per se of the auxiliary suspension component acts as a shutter element to control the transmission of light between the light source and photoresistor (or a phototransistor and can cooperate with the proximity switch to sense relative displacement or loading of the vehicle, thereby further simplifying the present design and associated manufacturing costs and installation time. An additional feature of the present invention resides in the fact that one or more of the struts or suspension components can be provided with the control system incorporating the LED, photoresistors, phototransistors or proximity switches so as to render each such component operable independent of others in a leveling system. For example, it may be desirable to have each of a plurality of suspension components operable independently of one another, such as in a leveling system for a recreational vehicle, etc. Additionally, it is to be noted that the scope of the present invention is not intended to be limited to only auxiliary suspension components, since the concepts disclosed herein will find highly satisfactory application in the primary suspension of a vehicle. In view of this extreme simplicity of design, manufacture and operation, universality of application and a minimum amount of maintenance and repair will be experienced with use of the present invention.

While it will be apparent that the preferred embodiments herein illustrated are well calculated to fulfill the objects above stated, it will be appreciated that the present invention is susceptible to modification, variation and change without departing from the scope of the invention.

We claim:
1. A vehicle leveling system comprising:
   at least one leveling strut having first and second portions connected with the sprung and unsprung portions of a vehicle, respectively, and movable relative to one another upon relative movement between the vehicle portions,
   means defining a chamber that is selectively pressurizable and depressurizable with a pressurizing media for changing the attitude between the vehicle portions, and
   pressure control means for controlling the pressure of pressurizing media in said chamber,
   said pressure control means including,
      a first solid state electrical position responsive means at one longitudinal position within said chamber,
      a second solid state electrical position responsive means at another longitudinal position within said chamber,
   said first and second portions of said strut being telescopically movable between a first position wherein said first and second parts are longitudinally displaced such that said first position responsive means produces a control signal to pressurize said chamber,
   a second position wherein said first and second parts are longitudinally displayed such that said second position responsive means produces a signal to depressurize said chamber, and
   a third position wherein said first and second parts are longitudinally displaced so that said first and second position responsive means produce no signal that would result in a change in pressure of said chamber.

2. The invention as set forth in claim 1 which includes an electrically energizable air compressor for supplying pressurized media in response to said control means.

3. The invention as set forth in claim 1 which includes a light source and wherein said first and second position responsive means produce said control signals in response to said light source.

4. The invention as set forth in claim 3 wherein said light source and said position responsive means are located directly on the peripheral wall of said pressurizable chamber.

5. The invention as set forth in claim 3 wherein a portion of said strut comprises shutter means interposable between said light source and said position responsive means for controlling the transmission of light from said source to said position responsive means.

6. The invention as set forth in claim 3 wherein said strut comprises a shock absorber and wherein a portion of said shock absorber is operable to control the transmission of light between said light source and said position responsive means.

7. The invention as set forth in claim 6 wherein said shock absorber comprises a piston rod, a dirt shield reciprocable with said piston rod, a rolling diaphragm defining said pressurizable chamber with said dirt shield, and wherein said light source and said position responsive means are mounted on said dirt shield.

8. The invention as set forth in claim 2 wherein said light source comprises a light emitting diode.

9. The invention as set forth in claim 1 wherein said position responsive means are responsive to light for producing said control signals.

10. The invention as set forth in claim 7 wherein said means responsive to said light source comprises a phototransistor.

11. A vehicle attitude control device comprising first and second telescopic sections in part defining a pressurizable chamber, first and second solid state signal means located within said chamber for controlling the pressure thereof, said solid state means being responsive to longitudinal displacement of said sections for selectively communicating a pressurized media to and from said chamber.

12. In the method of controlling vehicle attitude between the sprung and non-sprung portions of a vehicle with a leveling strut having first and second telescopic sections in part defining a pressurizable chamber, and pressure control means for controlling the pressure of pressurizing media in said chamber, the steps which include,
   selectively directing a beam of light between a source thereof and a light sensing means,
   controlling operation of said pressure control means at least in art with said light sensing means, and
   selectively interrupting the transmission of light from said source to said light sensing means in response to relative longitudinal displacement between said telescopic sections.

13. A vehicle attitude control device comprising:
   an auxiliary leveling component including first and second concentrically arranged and axially telescopically displaceable members, a pressurizable chamber having a volume that varies in accordance with the relative axial displacement of said members, a source of pressurizing fluid, and means controlling the pressure within said chamber and including solid state electrical control means located on one peripheral wall portion of said chamber and cooperative with another peripheral wall portion of said chamber for selectively communicating pressurized fluid from said source thereof to said chamber.

14. The invention as set forth in claim 13 wherein said source of pressurizing fluid includes an electrically energizable air compressor.

15. The invention as set forth in claim 13 wherein said means for controlling the pressure within said chamber comprises a light source and means responsive to said light source.

16. The invention as set forth in claim 15 wherein said another peripheral wall portion of said chamber is selectively interposable between said light source and said means responsive to said light source for determining relative longitudinal displacement between said members.

17. The invention as set forth in claim 15 wherein said another portion of said peripheral wall comprises a shock absorber reserve tube which acts as a shutter means by being interposable between said light source and said means responsive to said light source.

18. The invention as set forth in claim 15 wherein said strut comprises a shock absorber and wherein one of said members comprises a dirt shield and the other of said members comprises a cylinder within which the shock absorber piston is located.

19. The invention as set forth in claim 18 wherein said shock absorber comprises a piston rod, wherein said dirt shield is reciprocable with said piston rod, a rolling diaphragm defining said pressurizable chamber with said dirt shield, and wherein said light source and said means responsive to said light source are mounted on said dirt shield.

20. The invention as set forth in claim 13 wherein said means controlling the pressure within said chamber is operable to communicate pressurized fluid out of said chamber.

21. The invention as set forth in claim 13 wherein said means for controlling the pressure within said chamber is operable to cause actuation of an electrical solenoid valve.

22. The invention as set forth in claim 13 wherein said means for controlling the pressure within said chamber is operable to cause actuation of a pressurized fluid pump.

23. The invention as set forth in claim 22 wherein said means controlling said pressure within said chamber is operable to cause energization of an electric air compressor.

24. A vehicle attitude control device comprising a pair of axially displaceable members, means defining a pressurizable chamber, an electrically energized device for supplying pressurized media to and from said chamber, and electrical switching means for controlling actuation of said device, said switching means comprising a switching element on one of said members responsive to relative axial displacement between said members without in any way being mechanically connected to or engaged with or movable in response to the other of said members.

25. The invention as set forth in claim 24 wherein said switching means comprises a proximity switch device.

26. The invention as set forth in claim 24 wherein said electrically energized device comprises an electrically energizable air compressor.

27. The invention as set forth in claim 24 wherein said control device comprises a light source and means responsive to said light source.

28. The invention as set forth in claim 27 wherein said light source and said means responsive to said light source are located directly on the peripheral wall of said pressurizable chamber.

29. The invention as set forth in claim 27 wherein a portion of one of said members comprises shutter means interposable between said light source and said means responsive to said light source for controlling the transmission of light therebetween.

30. The invention as set forth in claim 29 wherein one of said members comprises the body of a hydraulic direct acting shock absorber, and wherein a portion of said shock absorber is operable to control the transmission of light between said light source and said means responsive to said light source.

31. The invention as set forth in claim 30 wherein said shock absorber comprises a piston rod, a dirt shield reciprocable with said piston rod, a rolling diaphragm defining said pressurizable chamber with said dirt shield and said shock absorber body, and wherein said light source and said means responsive to said light source are mounted on said dirt shield.

32. The invention as set forth in claim 24 wherein said electrically energized device comprises an electrically energizable valve communicating said chamber with a location having a pressure different than the pressure in said chamber.

33. The invention as set forth in claim 24 wherein said electrical switching means comprises at least one solid state electrical member mounted on a peripheral wall portion of said chamber.

34. The invention as set forth in claim 32 wherein said valve communicates said chamber with atmosphere.

35. A vehicle leveling system comprising, a pair of leveling struts each having first and second portions connected with the sprung and unsprung portions of a vehicle, respectively, and telescopically movable relative to one another upon relative movement between the vehicle portions, said first and second portions of each of said struts in part defining a variable volume chamber, an electrically energized source of presssurized actuating fluid and conduit means communicating said source with said chambers, and pressure control means for controlling operation of said actuating fluid source in response to changes in attitude between said vehicle portions, said pressure control means including first and second sensing means for sensing the relative positions between said first and second strut portions of at least one of said struts, said first sensing means being operable to produce a control signal for energizing said fluid source for extending said struts, and said second sensing means being operable to communicate said chambers with a location having a lower pressure than said chambers for contracting said strut, said sensing means comprising at least one proximity switch mounted on one of the associated strut portions and being actuable in response to the position of the other of the associated strut portions relative to said one portion and without any direct contact and engagement therewith.

36. A vehicle leveling system comprising, at least one leveling strut having first and second portions connected with the sprung and unsprung portions of a vehicle, respectively, and movable relative to one another upon relative movement between the vehicle portions, an electrically energized source of pressurized actuating fluid and conduit means communicating said source with said leveling struts, pressure control means for controlling operation of said actuating fluid source, said pressure control means including first and second solid state signal producing elements on one of said strut portions for producing control signals to said pressure control means in response to the longitudinal position of the other of said strut portions relative to said one portion and cooperable with the other of said strut portions, and time delay means for delaying selected operation of said fluid source upon reception of a control signal by said signal receiving element from said signal producing element.

37. A vehicle leveling system for a vehicle having sprung and unsprung portions including a power operated source of pressurized actuating fluid and at least one leveling strut having a variable volume chamber, means communicating said source of actuating fluid with said chamber, and pressure control means including, signal generating means at one longitudinal position within said chamber, first signal receiving means at another longitudinal position within said chamber, second signal receiving means at still another longitudinal position within said chamber, said first and second portions of said strut being telescopically movable between a first position wherein said first and second parts are longitudinally displaced so that a signal can be received from said generating means by each of said first and second receiving means, a second position wherein said first and second parts are longitudinally displaced so that a signal can be received from said generating means by one of said receiving means, and a third position wherein said first and second parts are longitudinally displaced so that signals will be transmitted by neither of said receiving means.

38. The invention as set forth in claim 25 wherein said proximity switch produces a control signal in response to a change in an electrical characteristic caused by one of said members moving to a predetermined proximate relation thereto.

39. In a vehicle leveling system for a vehicle having sprung and unsprung portions, at least one air adjustable leveling strut having a first portion connected with the sprung portion of the vehicle and a second portion connected with the unsprung portion of the vehicle, an electrically energized source of pressurized air and means communicating said source with said strut, and pressure control means for controlling operation of said air source, said control means including first and second solid state control elements mounted for movement with said first strut portion and responsive to the portions of the other of said strut portions, said pressure control means including, signal generating means at one longitudinal position within said chamber, signal receiving means at another longitudinal position within said chamber, said first and second portions of said strut being telescopically movable between a first position wherein said first and second parts are longitudinally displaced so that a signal can be transmitted from said generating means to said signal receiving means, and a second position wherein said first and second parts are longitudinally displaced so that a signal cannot be transmitted from said generating means to one of said receiving means.

* * * * *

UNITED STATES PATENT OFFICE
CERTIFICATE OF CORRECTION

Patent No. 4,017,099                           Dated April 12, 1977

Inventor(s) Robert W. Hegel, Burke A. West and Robert H. Verb

It is certified that error appears in the above-identified patent and that said Letters Patent are hereby corrected as shown below:

Col. 1, line 50, "3,606,475" should be --3,606,375--;
Col. 1, line 57, "relate" should be --related--.
Col. 3, line 51, "(not shown)" should be -- (now shown) --.

Col. 4, line 56, "C1L" should be --CL--;
Col. 4, line 61, "axially" should be --axial--.
Col. 5, line 28, "conduit" should be --circuit--;
Col. 5, line 49, "125" should be --126--.
Col. 6, line 14, "84" should be --94--;
Col. 6, line 38, "resitor" should be --resistor--;
Col. 6, line 65, after "junction", "trnsistor" should be --transistor--.
Col. 7, line 56, "in" should be --In--.
Col. 8, line 61, "tht" should be --that--.

Signed and Sealed this

Eighth Day of November 1977

[SEAL]

Attest:

RUTH C. MASON
Attesting Officer

LUTRELLE F. PARKER
Acting Commissioner of Patents and Trademarks